United States Patent

Campbell

[15] 3,639,912

[45] Feb. 1, 1972

[54] MANAGEMENT CONTROL SUBSYSTEM FOR MULTIPROGRAMMED DATA PROCESSING SYSTEM

[72] Inventor: Donald J. Campbell, Phoenix, Ariz.

[73] Assignee: Honeywell Information Systems Inc.

[22] Filed: Apr. 16, 1969

[21] Appl. No.: 816,624

[52] U.S. Cl. ............................................ 340/172.5, 444/1

[51] Int. Cl. ............................................ G05b 19/04

[58] Field of Search ............................................ 340/172.5

[56] References Cited

UNITED STATES PATENTS

| | | | |
|---|---|---|---|
| 3,297,999 | 1/1967 | Shimabukuro | 340/172.5 |
| 3,373,408 | 3/1968 | Ling | 340/172.5 |
| 3,413,613 | 11/1968 | Bahrs et al. | 340/172.5 |
| 3,480,916 | 11/1969 | Belt et al. | 340/172.5 |
| 3,487,375 | 12/1969 | Macon et al. | 340/172.5 |

*Primary Examiner*—Paul J. Henon
*Assistant Examiner*—Paul R. Woods
*Attorney*—Fred Jacob and Edward W. Hughes

[57] ABSTRACT

A management control subsystem for a multiprogrammed data-processing system, wherein a varying amount of working storage space is reserved for the use of the management control subsystem in providing management control services for the user programs, the amount of working storage space reserved corresponding to the number of user programs in execution.

4 Claims, 2 Drawing Figures

WORKING STORAGE TOPOLOGY

INVENTOR
DONALD J. CAMPBELL

BY

ATTORNEY

WORKING STORAGE TOPOLOGY

MANAGEMENT CONTROL SUBSYSTEM FOR MULTIPROGRAMMED DATA PROCESSING SYSTEM

BACKGROUND OF THE INVENTION

This invention relates to multiprogrammed data-processing systems and more particularly to a management control subsystem for multiprogrammed data processing systems.

A multiprogrammed data-processing system provides simultaneous execution of a number of user programs. In the modern multiprogrammed data-processing system each of the one or more data processors thereof alternately executes successive portions of a plurality of user programs. In such system, a data processor assigned to execute a particular user program continues until the program either voluntarily relinquishes control of the data processor or is involuntarily interrupted. A program relinquishes control when it cannot continue until after the occurrence of some future event, such as the receipt of input data or when it terminates. The released processor is immediately assigned to execute another waiting and ready program, either commencing initial execution of a new program, or execution of a program from its last point of relinquishment or interruption. The processor again continues this program in execution until a new point is reached wherein the program relinquishes the processor or the program is interrupted. Meanwhile the voluntarily relinquishing program is interrupted. Meanwhile the voluntarily relinquishing programs stand by, awaiting the occurrences of their respective required events, whereupon they again become candidates for further execution. The interrupted programs, on the other hand, usually are immediate candidates for execution, but must wait assignment of a data processor according to a predetermined rule designed to maintain maximum system efficiency.

A program comprises a series of instructions for directing the assigned data processor to execute in sequence the individual steps necessary to perform a particular data processing operation. The data processor communicates with the working store of the system to retrieve from respective cells thereof each instruction to be executed and data items to be processed and to store therein data items which have been processed. Most of the instructions comprise an order portion denoting the type of operation the data processor must execute and an address portion representing the location of a cell in working storage from which a data item is to be retrieved for processing or into which a processed data item is to be inserted. Moreover, the data processor supplies an address representation to denote the cell from which the next instruction is to be obtained.

Because the retrieval and storage time of working storage must be very short for compatibility with the very rapid rate of instruction execution of the modern data processor, the cost of working storage capacity is relatively great. Therefore, economical reasons limit the size of the fast operating working store and, accordingly, the number of programs and quantity of information it can store at a particular time. In the large modern multiprogrammed data-processing systems supplemental storage must be provided for holding all user programs received from input devices and awaiting scheduling for execution, user program "libraries", and data files. This supplemental storage is provided by mass quantities of relatively inexpensive and slow "auxiliary storage". The auxiliary store is coupled for communication with the working store to supply programs and information to working storage as they are required for processing. Additionally, the auxiliary store relieves working storage of processed data, providing temporary storage prior to transmittal of the processed data to an output device.

In order that the data processors can perform efficiently the required sequential and fragmented execution of user programs in a multiprogrammed data-processing system, at least a portion of each of the user programs currently in process must be held in the working storage portion of the system. A data processor is thereby enabled instantly to retrieve from working storage and execute the next following instruction of the user program it is currently executing or the first required instruction of the user program that succeeds the relinquishment by or interruption of another user program. Therefore, the following definition provides a functional picture of the nature and operation of a modern multiprogrammed data processing system:

The operation of a data processor so as to process a set of user programs effectively concurrently by alternating and interleaving their execution, wherein the working store contains simultaneously at least a subset of said set of programs.

To implement multiprogramming, a management control subsystem including a group of management control programs, program parts, and subroutines is required for exercising supervisory control over the data-processing system. The group of management control programs, program parts, and subroutines is termed an "operating system." The primary purpose of the operating system is to maintain the user programs in efficient concurrent execution by effective allocation of the limited system resources to the programs, these resources including the data processors, working store, and input and output equipment. The operating system performs the following characteristic functions:

1. Scheduling, dispatching, and coordinating programs, and loading programs, program parts, and subroutines into working storage.
2. Retrieving programs, program parts, subroutines and information from auxiliary storage when required.
3. Allocating and overlaying working storage.
4. Assigning input/output (I/O) channels and devices to programs.
5. Initiating I/O operations and supervising the termination of these operations.
6. Removing a program from working storage when it terminates or when certain error conditions occur.
7. Maintaining a program library and a user file system.
8. Maintaining a log of system operation and preparing accounting information.

For simplicity, the terms "program" and "program part" will be used interchangeably hereinafter to mean a program, program part or subroutine. The term "module" will be used hereinafter to mean an operating system program part or subroutine.

In the prior art multiprogrammed data-processing systems, a portion of working storage is reserved for holding all operating system programs and modules which are in execution. User programs, on the other hand, are loaded into and executed from any available region of the nonreserved portion of working storage. A number of operating system programs and modules are permanently resident in one region of the reserved portion of working storage, whereas the remainder of the reserved portion is occupied by a variable number of different operating system programs and modules that are transferred from auxiliary storage to the reserved portion of working storage as they are required. The permanently resident portion of the operating system consists of those programs and modules which are most frequently required and which must be available immediately for maintaining most efficient continued operation of the multiprogrammed system. The permanently resident programs include, for example, the dispatcher, which queues user programs and dispatches them to data processors for execution, and the working storage allocator, which maintains a continuous surveillance of the assigned and available working storage space and allocates available working storage space to programs. The temporarily resident modules include those which perform direct service functions for user programs, functions which the user programs, themselves, are unable or are not permitted to perform. The temporarily resident modules include, for example, a module which obtains for a user program the identity of the I/O apparatus assigned to serve such program, and the program termination subroutine, which provides for the orderly completion of terminating programs.

The amount of working storage space reserved in these prior art multiprogrammed systems is sufficient to hold all of the essential operating system programs and modules that may be required to be in simultaneous execution. If adequate working storage space is not made available for the operating system, the data-processing system may be greatly slowed or even may be unable to continue in operation. Accordingly, these prior art management control subsystems reserve permanently a very large portion of the working store for the operating system, in order to accommodate the working storage space requirements for the anticipated worst-case conditions. With such a large portion of working storage reserved for the operating system, only a limited number of user programs can occupy the remaining nonreserved portion of working storage. This adversely affects the overall performance of these prior art data-processing systems, because their primary function is to execute user programs, and often there is no user program in working storage ready for execution. In such instance either a data processor must stand idle, awaiting the occurrence of one of the events required for the resumption of a user program, or at least one of the waiting user programs in the working store must be "swapped" with another user program in the auxiliary store. However, considerable nonproductive time is expended in swapping one user program for another, because the I/O system usually must return to auxiliary storage at least part of the user program being replaced and must then load the next user program into the released region of working storage. Therefore, it is a particular disadvantage of these prior art management control subsystems to reserve a large portion of working storage space for the operating system.

Another disadvantage of the aforementioned prior art management control subsystems is that much of the large reserved portion of working storage is often idle, because most of the time only a few of the operating system programs and modules are required to be in execution. This reservation of a large amount of idle working storage space, which is not available for the waiting user programs, is inconsistent with an operating system's primary purpose of effective allocation of system resources to maintain user programs in efficient concurrent execution.

Accordingly, it is desirable to provide means to reduce the amount of working storage space reserved for holding operating system programs and modules so as to free space for user programs, yet to provide sufficient working storage space for all essential operating system programs and modules required to be in simultaneous execution. Moreover, it is desirable to provide means to reduce the amount of idle working storage space not available for user programs.

Therefore, it is the principal object of this invention to provide an improved management control subsystem for a multiprogrammed data-processing system.

Another object of this invention is to provide an improved operating system for a multiprogrammed data-processing system.

Another object of this invention is to provide a management control subsystem for a multiprogrammed data-processing system which affords more effective utilization of working storage.

Another object of this invention is to provide a management control subsystem which minimizes the amount of working storage reserved for the operating system.

Another object of this invention is to provide a management control subsystem which minimizes the amount of idle working storage space not available for user programs.

Another object of this invention is to provide a management control subsystem which minimizes the amount of idle storage space reserved for the operating system.

The management control subsystem, in managing and supervising the user programs in concurrent execution, maintains management information concerning each of these user programs. For example, complete information about the status of the user program must be maintained, including information as to whether a program is in execution or awaiting assignment of a data processor, whether certain priority functions must be accomplished before a program can be placed in initial execution or placed in execution after relinquishment or interruption, whether a program must be swapped, whether certain error conditions have occurred preventing further execution of the program, whether the program has earlier relinquished control of its processor, etc. The management control subsystem also maintains complete tables relating the I/O channels and devices actually allocated to each user program during execution to the symbolically identified I/O channels and devices by which the user program calls out its requirements for the use of I/O channels and devices.

In the prior art multiprogrammed data-processing systems, another portion of working storage is reserved for holding this management information. Sufficient working storage is reserved to hold management information for the largest number of user programs which are permitted to be in simultaneous execution. The multiprogrammed system, however, operates with a widely varying user program load. At one moment many small user programs may be in concurrent execution, whereas at other times only a few large programs may be in execution. Except for those infrequent periods when the maximum permitted number of user programs is in execution, some or much of the working storage space reserved for management information is not being utilized. As described above, this reservation of idle working storage space, which otherwise could be occupied by user programs in execution, impairs the effective operation of the prior art multiprogrammed data-processing systems.

Therefore, it is another object of this invention to provide a management control subsystem which minimizes the amount of working storage space reserved for management information.

Another object of this invention is to provide a management control subsystem which minimizes the amount of idle working storage space reserved for management information.

As described above, the prior art multiprogrammed data-processing systems provide for the reservation of a very large portion of working storage in order to accommodate the operating system requirements for the anticipated worst-case conditions. To avoid having to reserve even more space in working storage, these prior art data-processing systems permit only one copy of each different operating system program and module to occupy the working store. In the modern multiprogrammed system conditions are frequently encountered wherein a number of user programs concurrently require the services of the same operating system program or module. However, because only one copy of each operating system program or module is available, all user programs requiring a common operating system program or module must be queued to await the service of the operating system.

Queueing of user programs to await an operating system program or module adversely affects the overall performance of the data-processing system. For example, within a close interval, a group of user programs may reach a condition requiring the initiation of an I/O operation. Each program of the group thereupon calls for the services of the appropriate operating system module. The single copy of the I/O-initiation module permitted must serve the calling user programs in succession, and each such user program must await its servicing before proceeding. This situation seriously impairs the efficiency of the multiprogrammed data-processing system, because only one user program of the group requiring I/O service is effectively in execution and the remainder of the group are idle. A similar inefficiency occurs when, within a close interval, a number of user programs terminate and thereby require the services of the operating system termination module.

Accordingly, it is desirable to provide means for enabling the concurrent execution of multiple copies of operating system programs and modules as they are required simultaneously by the user program complement. However, these multiple copies should be provided without requiring the permanent reservation of corresponding space in working storage.

Therefore, it is another object of this invention to provide an improved management control subsystem for a multiprogrammed data-processing system which affords the simultaneous execution of multiple copies of operating system programs and modules.

Another object of this invention is to provide an improved management control subsystem for a multiprogrammed data-processing system which affords the simultaneous execution of multiple copies of operating system programs and modules without impairing the effective utilization of working storage.

In the prior art multiprogramming systems described, a number of different operating system programs serving the same user program often are resident in the reserved portion of working storage, thereby denying a substantial portion of working storage to other programs. Frequently, an operating system program, while performing a service for a user program, requires, in turn, the services of another operating system program. For example, if an operating system program requires information from the auxiliary store it calls for an I/O supervisor program to obtain the information. An operating system program to obtain the information. An operating system program calling another suspends execution and the called program commences execution. However, the calling operating system program remains in working storage because it has not completed execution. Thus, at times a chain of operating system programs and modules may be resident in the working store, all assigned to provide services directly or indirectly for the same user program.

Another user program requiring the services of an operating system program may be involuntarily suspended for a relatively long period because the reserved storage space is occupied with a chain of operating system programs providing services for a different user program. This indirect monopolization of the working store by a user program adversely affects the overall performance of the data-processing system.

Accordingly, it is desirable to provide means to reduce the number of operating system programs and modules simultaneously in working storage providing services for the same user program, while at the same time ensuring the availability of working storage space for all operating system programs required by each user program in execution.

Therefore, it is another object of this invention to provide an improved management control subsystem which prevents the monopolization of working storage space on behalf of a particular user program.

Another object of this invention is to provide an improved management control subsystem which minimizes the amount of working storage space occupied by operating system programs providing services for a particular user program.

Another object of this invention is to provide an improved management control subsystem which ensures working storage space for operating system programs required by user programs in execution.

SUMMARY OF THE INVENTION

The foregoing objects are achieved according to the instant invention by providing, in a multiprogrammed data-processing system, a management control subsystem which reserves a varying amount of working storage according to the number of user programs in execution. According to one embodiment of the instant invention, the operating system of the management control subsystem reserves a management control block in working storage for each user program in execution. Management control blocks are reserved for the use of the operating system in providing management control services for the corresponding user programs. A management control block comprises a set of contiguous working storage cells and is disposed adjacent to the corresponding user program in whatever region of working storage the user program is loaded. The working storage space for each management control block is reserved only when a user program is allocated working storage and, therefore, the number of blocks for which space is reserved corresponds to the number of user programs in execution.

The management control blocks of the instant invention supply most of the working storage space requirements of the operating system for managing, supervising, and servicing the needs of the corresponding user programs. The operating system modules which provide direct services for a particular user program are loaded into and executed from the management control block adjacent to that user program. In addition, the operating system stores much of the management information relating to each user program in the corresponding management control block. Therefore, the amount of working storage space reserved for holding the operating system programs and modules that provide direct management services for the user programs and for holding management information corresponds to the number of user programs in current execution. Accordingly, the instant invention, by providing an amount of working storage reserved for the operating system which varies in accordance with the number of user programs in current execution, avoids the aforementioned disadvantages of the prior art multiprogrammed data-processing systems and provides the most effective utilization of the working storage and most efficient operation of the data-processing system.

Moreover, the instant invention, by providing a management control block for each user program in execution, alleviates the above-mentioned problems that are created by permitting only one copy of operating system programs and modules. Whenever a user program requires the services of the operating system, the required module is immediately loaded into and executed from the management control block reserved for that user program. As many copies of a particular operating system module as are required simultaneously by different user programs are allowed to be in concurrent execution in their respective management control blocks. This advantage of the instant invention over the prior art operating systems is realized without permanently reserving sufficient working storage space to accommodate the anticipated maximum number of multiple copies of the different operating system programs and modules.

In those situations wherein a chain of operating system modules are required to provide services for a particular user program, each module of the chain is executed from the management control block reserved for that user program. When a first operating system module that is in execution from a management control block requires the services of a second module, the first module suspends operation and calls for the second module. The operating system responds to the call and "pushes down" the first module. The push down function is accomplished by returning the first module to the auxiliary store from the management control block and then overlaying the first up"in the management control block with the second module. When execution of the second module is completed, the first module is "popped up∞ by retrieving the first module from auxiliary store, overlaying the second module in the management control block with the first module, and resuming execution of the first module from the point of suspension.

In this manner an entire chain of operating system modules can be executed for a particular user program from the same management control block. As each module of the chain is suspended, it is pushed down in auxiliary store on top of the "list" of previously suspended modules of the chain. As each module of the chain terminates, the last pushed down module is retrieved from the top of the list in auxiliary store and placed in execution in the management control block.

Therefore, the instant invention, by providing a flexible reserve of working storage as the operating system requirements vary with the number of user programs in execution, affords a more effective utilization of the working store, maintains a maximum number of user programs in execution, and provides for the most efficient operation of the multiprogrammed data-processing system.

Certain portions of the system and processes herein disclosed are not my invention, but are the inventions of:

D. J. Campbell and W. J. Heffner, as defined by the claims of their application, Ser. No. 821,811, filed May 5, 1069; and D. J. Campbell, W. J. Heffner, P. H. Jennings, and J. E. King, as defined by the claims of their application, Ser. No. 830,724, filed June 5, 1969.

Both of the above applications are assigned to the assignee of the present application.

BRIEF DESCRIPTION OF THE DRAWING

The invention will be described with reference to the accompanying drawing, wherein.

It will be noted that the FIGURES are numbered to correspond to the numbering of the FIGURES of the Campbell et al., application, Ser. No. 821,811, referenced above.

Figure 1:
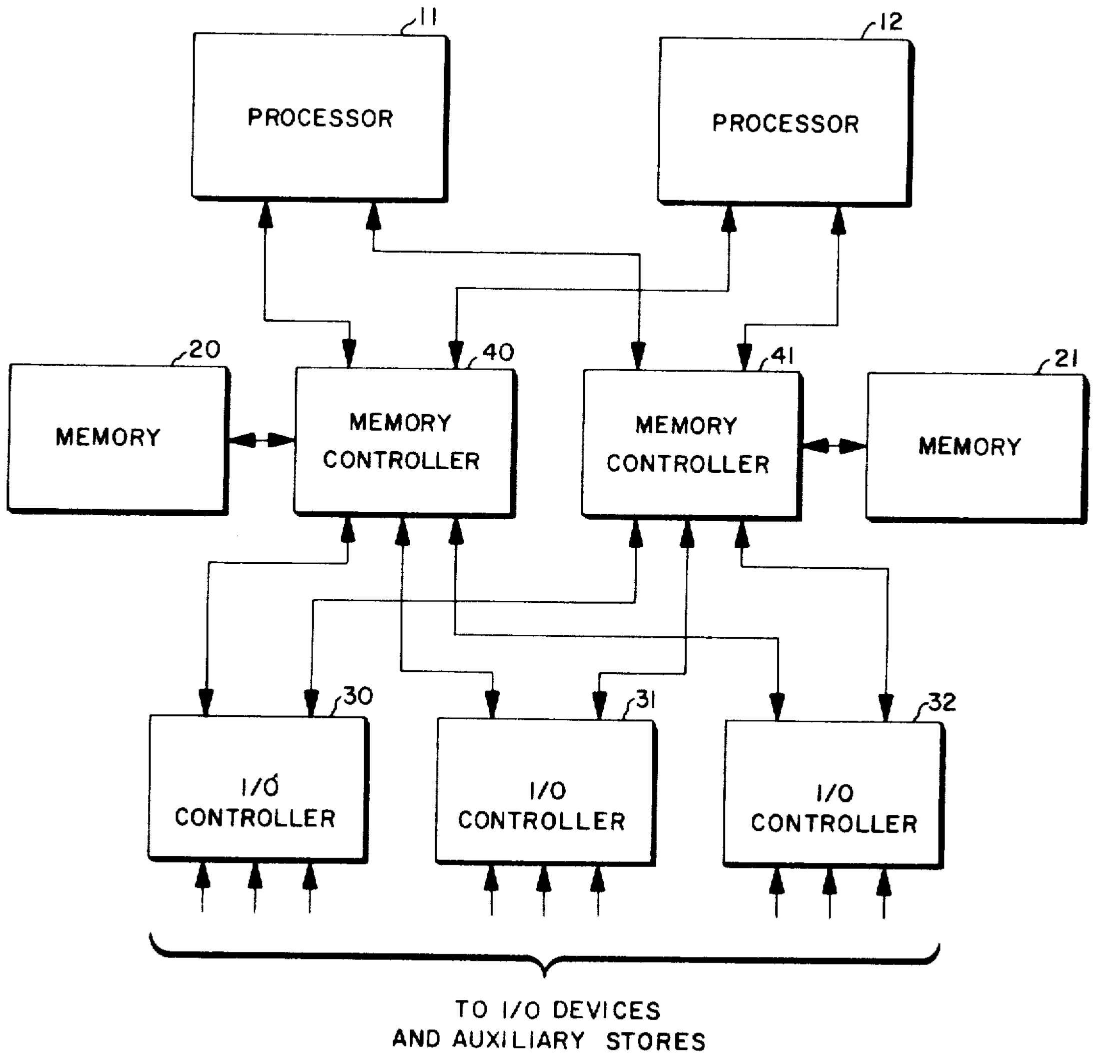
FIG. 1 is a block diagram of a data-processing system to which the instant invention is applicable.
Figure 3:
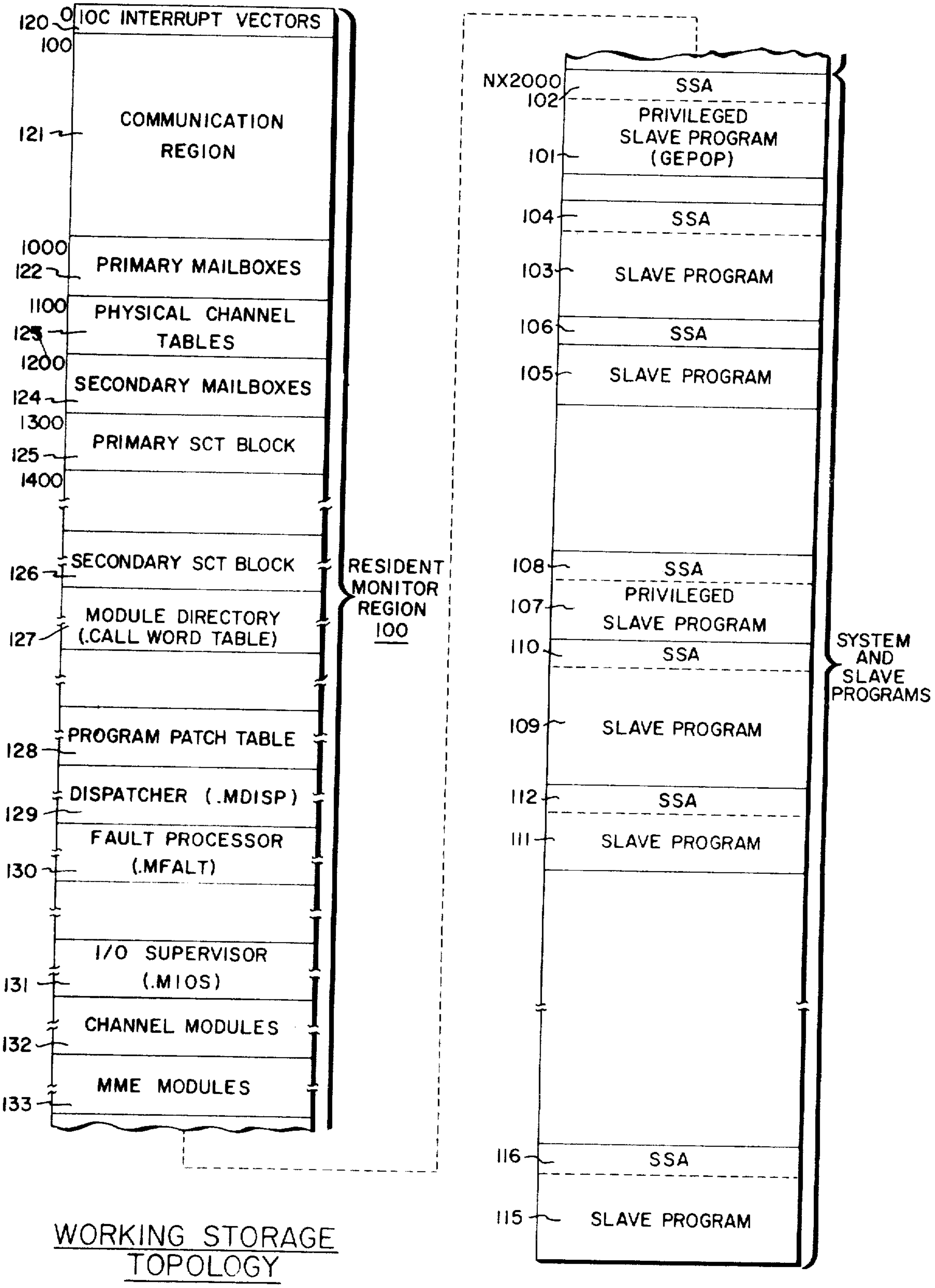
FIG. 3 is a diagram of the organization of working storage in the instant invention.

For a complete description of the system and arrangement of FIGS. 1 and 3, of the process and operations performed thereby or with respect thereto, and of the present invention, reference is made to U.S. Pat. application, Ser. No. 821,811, filed May 5, 1969, entitled "Management Control Subsystem for Multiprogrammed Data-Processing System" by D. J. Campbell and W. J. Heffner, and assigned to the assignee of the present invention. More particularly, attention is directed to FIGS. 2 and 4 through 49 of the drawings and to the specification beginning at page 18, line 6 and ending at page 185, line 16, of U.S. Pat. application, Ser. No. 821,811, which are incorporated herein by reference and made a part hereof as if fully set forth herein.

I claim:

1. In a data-processing system, including a working store memory adapted to store data words in storage cells of said memory, an auxiliary store coupled for communication with said working store memory, and a data processor connected to said memory for transferring words to and from said memory, a method of allocating portions of said memory for multiprogramming comprising:

allocating a portion of said memory to resident monitor functions;

subdividing the remaining portions of said memory into blocks of available storage;

maintaining a list of available blocks of storage;

allocating sets of blocks of available storage for respective slave programs for storing said slave programs and for providing areas of working storage;

allocating additional blocks from said list for available blocks of storage for respective slave programs for use as slave service areas;

removing said sets of blocks and said additional blocks from said list of available blocks of storage;

during execution of said slave programs, storing operating system programs from said auxiliary store, in said slave service area which provides management control services for said slave programs in response to sensing an instruction in said slave program making one of said management control services.

2. The method of claim 1, further comprising:

upon termination of a slave program execution, returning those blocks of available storage allocated to the slave program to said list of available blocks of storage.

3. In a data-processing system, including a working store memory adapted to store data words in storage cells of said memory, and a data processor connected to said memory for transferring words to and from said memory, a method of allocating and using portions of said memory for multiprogramming comprising:

allocating a portion of said memory to resident monitor functions;

subdividing the remaining portions of said memory into equal-sized blocks of available storage;

loading fault processor and dispatcher programs in said portion of said memory allocated to resident monitor functions;

maintaining a list of available blocks of storage;

allocating blocks of available storage for respective slave programs for storing said slave programs and for providing areas of working storage;

allocating additional blocks from said list of available blocks of storage for respective slave programs for use as slave service areas;

removing said blocks allocated to slave programs and slave service areas of said list of available blocks of storage;

storing, in said slave service area, operating system programs which provide management control services for said slave programs.

4. The method of claim 3 further comprising:

responding to fault-program-invoking instructions in said slave program to cause execution of said dispatcher program to load an operating system function program into an associated said slave service area.

* * * * *